United States Patent
Milligan et al.

(10) Patent No.: US 7,529,241 B2
(45) Date of Patent: May 5, 2009

(54) SYSTEMS AND METHODS FOR PROVIDING A NETWORK BRIDGE FOR UDP MULTICAST TRAFFIC

(75) Inventors: Thomas Milligan, South Jordan, UT (US); Bryant Eastham, Draper, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 548 days.

(21) Appl. No.: 11/313,282

(22) Filed: Dec. 20, 2005

(65) Prior Publication Data

US 2007/0140213 A1 Jun. 21, 2007

(51) Int. Cl.
*H04L 12/28* (2006.01)
*H04J 3/26* (2006.01)
(52) U.S. Cl. .................. 370/390; 370/401; 370/432
(58) Field of Classification Search ............ 370/389, 370/390, 400, 401, 428, 429, 432
See application file for complete search history.

(56) References Cited

U.S. PATENT DOCUMENTS

| | | | | |
|---|---|---|---|---|
| 6,700,871 | B1 * | 3/2004 | Harper et al. ............... | 370/235 |
| 6,707,796 | B1 * | 3/2004 | Li ............................... | 370/254 |
| 6,976,205 | B1 * | 12/2005 | Ziai et al. .................... | 714/807 |
| 7,130,266 | B2 * | 10/2006 | Virtanen et al. .............. | 370/230 |
| 7,167,473 | B1 * | 1/2007 | Nguyen ....................... | 370/392 |
| 7,170,885 | B2 * | 1/2007 | Hirota et al. ................. | 370/351 |
| 2003/0012202 | A1 * | 1/2003 | Fukutomi ............. | 370/395.52 |
| 2003/0223402 | A1 * | 12/2003 | Sanchez et al. ............. | 370/351 |
| 2005/0100016 | A1 | 5/2005 | Miller et al. | |
| 2005/0141507 | A1 * | 6/2005 | Curtis ......................... | 370/392 |
| 2005/0190765 | A1 * | 9/2005 | Gotoh et al. ................. | 370/390 |
| 2005/0204042 | A1 | 9/2005 | Banerjee et al. | |
| 2005/0213525 | A1 | 9/2005 | Grayson et al. | |
| 2005/0286455 | A1 | 12/2005 | Fernandes et al. | |
| 2006/0002320 | A1 | 1/2006 | Costa-Requena et al. | |

FOREIGN PATENT DOCUMENTS

JP 2001177523 6/2001

OTHER PUBLICATIONS

R. Finlayson, RFC 2588, IP Multicast and Firewalls, http://www.ietf.org/rfc/rfc2588.txt.

* cited by examiner

*Primary Examiner*—Hong Cho
(74) *Attorney, Agent, or Firm*—Austin Rapp & Hardman

(57) ABSTRACT

A multicast repeater is located on a host computer system on a network. One or more other multicast repeaters on other networks are discovered. These other multicast repeaters are located on networks that are separated from the network comprising the host by at least one networking device that is not configured to route UDP multicast addressing. Each time that a UDP multicast request packet is received via multicast, the multicast repeater determines whether the multicast repeater has previously forwarded the UDP multicast request packet. If the multicast repeater has previously forwarded the UDP multicast request packet, it ignores the UDP multicast request packet. However, if the multicast repeater has not previously forwarded the UDP multicast request packet, the multicast repeater sends the UDP multicast request packet via TCP/IP to the one or more other multicast repeaters that have been discovered.

18 Claims, 11 Drawing Sheets

SYSTEMS AND METHODS FOR PROVIDING A NETWORK BRIDGE FOR UDP MULTICAST TRAFFIC

TECHNICAL FIELD

The present invention relates generally to computers and computer-related technology. More specifically, the present invention relates to systems and methods for providing a network bridge for UDP multicast traffic.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

Embedded systems may establish connections to other electronic devices for a variety of reasons. For example, an organization may want to make data about its embedded systems available to certain remote clients. An embedded system may also allow these remote clients to control the behavior of the embedded system. For example, problems found with calibration may be adjustable remotely instead of sending a person to the location of the embedded system. Alternatively, or in addition, the embedded system may allow its behavior to be changed remotely in much the same way it can be changed locally. One example would be locking a door remotely. This kind of remote control is not limited to the functionality available locally, and in many cases may exceed the local capabilities. One example would be a sensor that has no local interface but allows remote control of its behavior.

To communicate with other electronic devices, an embedded system may connect to a computer network. Sometimes it is desirable for an embedded system to send a message to a group of electronic devices that are located in one or more computer networks. Where the recipient group is numerically large in size but small compared to the overall number of devices in the network(s), multicast routing is often used. Multicasting refers to the process of sending a message simultaneously to more than one destination on a network. Multicasting is different from broadcasting in that multicasting means sending to specific groups within a network, whereas broadcasting implies sending to everybody on the network. With multicast technology, the bulk of the data is typically transmitted once from its source through major backbones of the network and is multiplied, or distributed out, at switching points closer to the destinations.

The User Datagram Protocol (UDP) may be used in connection with multicast routing. This is often referred to as UDP multicasting. UDP provides a way for applications to send encapsulated IP datagrams and send them without having to establish a connection.

A problem may arise when an embedded system tries to send a message via UDP multicasting to electronic devices that are located in different networks. Computer networks may be constrained to isolate specific network traffic, and to allow restricted sets of computers to communicate. These constraints, imposed by network devices such as routers and firewalls, purposely limit the use of UDP multicast addressing. If two networks are separated by a networking device that is not configured to route multicast addressing, then it may be difficult for multicast requests that originate on one isolated network to be delivered to computers on another isolated network. Accordingly, what is needed are mechanisms for providing a network bridge for UDP multicast traffic, i.e., for getting multicast packets from one network to another network across networking devices that are not configured to route multicast addressing.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
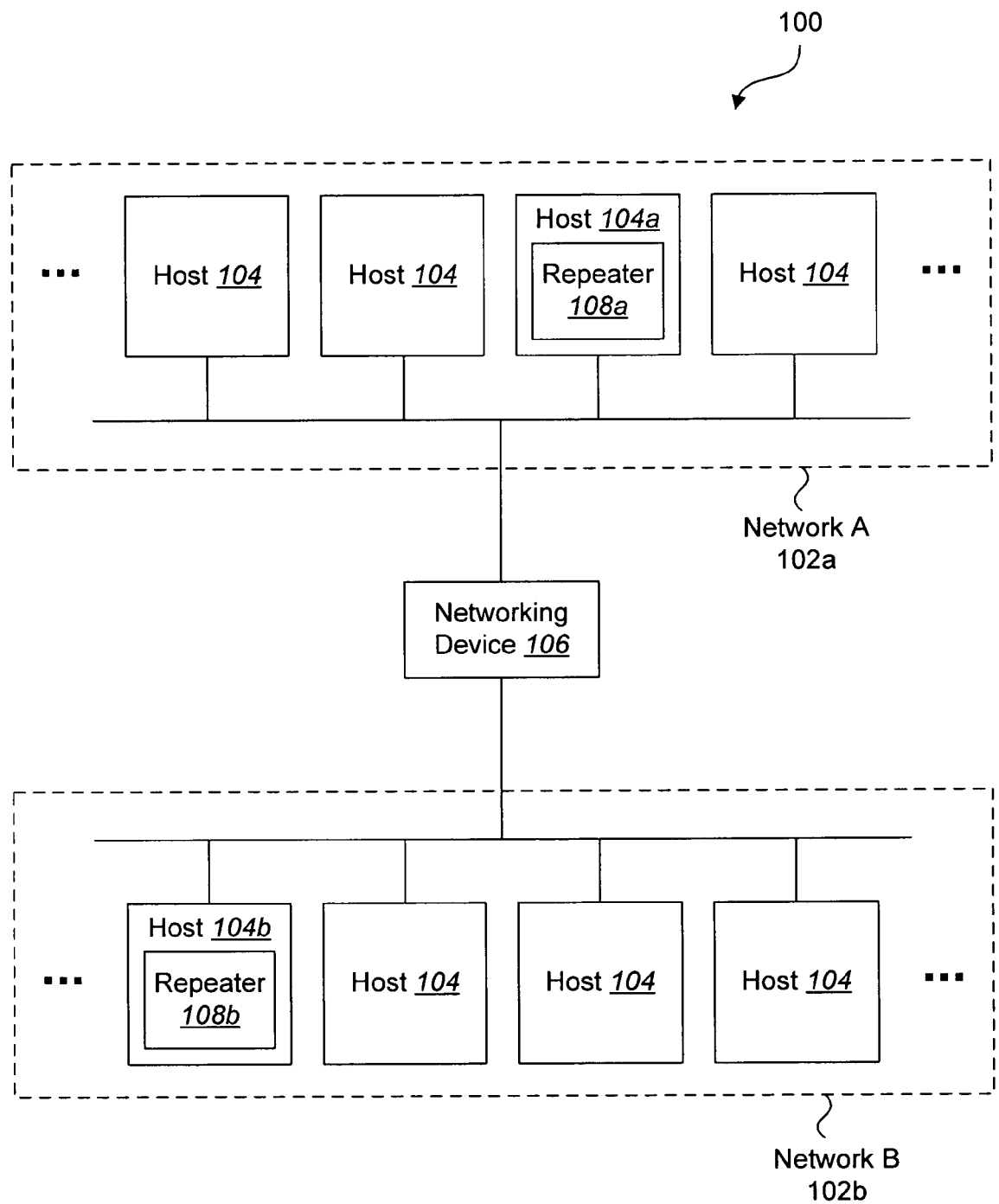
FIG. 1 illustrates a system for providing a network bridge for UDP multicast traffic according to an embodiment.

Systems and methods for providing a network bridge for UDP multicast traffic are disclosed. In an exemplary embodiment, a multicast repeater on a host computer system on a network maintains information about one or more other multicast repeaters in other networks that have been discovered. Each of these multicast repeaters may be located within a network that is separated from the network comprising the host by at least one networking device that is not configured to route UDP multicast addressing. Each time that a UDP multicast request packet is received via multicast, the multicast repeater determines whether the multicast repeater has previously forwarded the UDP multicast request packet. If the multicast repeater has previously forwarded the UDP multicast request packet, the UDP multicast request packet is ignored. If the multicast repeater has not previously forwarded the UDP multicast request packet, the multicast repeater sends the UDP multicast request packet to the one or more other multicast repeaters that have been discovered.

The UDP multicast request packet may be sent via a connection (e.g., a TCP/IP connection) to the other discovered repeater(s). Before the UDP multicast request packet is sent to the other multicast repeaters, the multicast repeater may encapsulate data of the UDP multicast request packet according to a wrapper protocol.

In some embodiments, the step of determining whether the multicast repeater has previously forwarded the UDP multicast request packet may involve extracting a globally unique packet identifier from the UDP multicast request packet, and searching for the packet identifier in an identifier cache. If the multicast repeater has not previously forwarded the UDP multicast request packet, the multicast repeater may record the packet identifier in the identifier cache. The multicast repeater may also record a network address and port where the UDP multicast request packet originated in the identifier cache.

The multicast repeater may receive a forwarded UDP multicast request packet from another multicast repeater on a different network. If the data of the forwarded UDP multicast request packet is encapsulated according to a wrapper protocol, then the multicast repeater may unwrap the forwarded UDP multicast request packet to obtain the encapsulated data. The multicast repeater may send the forwarded UDP multicast request packet via multicast on the multicast repeater's network.

The multicast repeater may receive a UDP multicast response packet. In response, the multicast repeater may determine whether a corresponding UDP multicast request packet originated on the network. If a corresponding UDP multicast request packet originated on the network, the multicast repeater may identify an originating application for the corresponding UDP multicast request packet, and send the UDP multicast response packet to the originating application.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates a system 100 for providing a network bridge for UDP multicast traffic according to an embodiment. The system 100 includes multiple computer networks 102. In the illustrated embodiment, two networks 102 are provided, namely network A 102a and network B 102b. Each network 102 includes a plurality of interconnected computer systems, which will be referred to as hosts 104.

The networks 102 are separated by at least one networking device 106 that is not configured to route multicast addressing. For example, the networks 102 may be separated by a router, firewall, etc.

Each network 102 includes at least one host 104 that includes a multicast repeater 108. In general terms, a multicast repeater 108 is a network bridge that allows multicast requests that originate on one isolated network (e.g., network A 102a) to be repeated to and responded by hosts 104 on another isolated network (e.g., network B 102b). To accomplish this, each multicast repeater 108 is configured to forward each multicast request that it receives to all other known repeaters 108 (unless the repeater 108 has already processed the multicast request; this will be discussed in greater detail below). Each repeater 108 has its own globally unique identifier. This identifier may be used to forward multicast requests to the repeater 108. Multicast repeaters 108 facilitate application level control of UDP multicast data dissemination, thereby limiting network traffic to desired application needs within the constraints of regulated and protected networks 102.

Although two networks 102 are shown in FIG. 1, embodiments may be practiced in systems where more than two networks 102 are connected by networking devices 106 that are not configured to route multicast addressing. In such embodiments, at least one host 104 in each network 102 may include a multicast repeater 108. Also, although both networks 102 shown in FIG. 1 only include a single repeater 108, in alternative embodiments multiple repeaters 108 may be provided within a single network 102.

Figure 2:
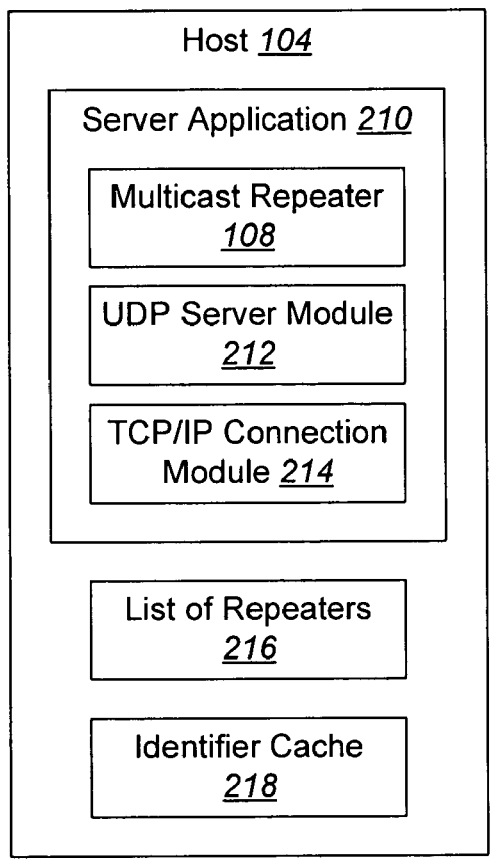
FIG. 2 illustrates software components and other data that may be provided on a host that comprises a multicast repeater according to an embodiment.

FIG. 2 illustrates software components and other data that may be provided on a host 104 that comprises a multicast repeater 108. As shown, the multicast repeater 108 may be part of a server application 210 that is running on the host 104. The server application 210 may include a UDP server module 212. The UDP server module 212 may be configured to listen on a specific multicast address and port for UDP multicast packets. In some embodiments, the multicast repeater 108 registers with the UDP server module 212, and the UDP server module 212 forwards any UDP multicast packets that it receives to the multicast repeater 108 for processing.

The server application 210 may also include a TCP/IP connection module 214 that is configured to set up TCP/IP connections to multicast repeaters 108 on other networks 102. When a TCP/IP connection is established to another network 102, any multicast repeaters 108 that are on that network 102 are automatically discovered and added to a list 216 of discovered repeaters.

The multicast repeater maintains an identifier cache 218. The identifier cache 218 is used to store information about the request packets that the multicast repeater 108 has previously forwarded to other repeaters 108.

Figure 3:
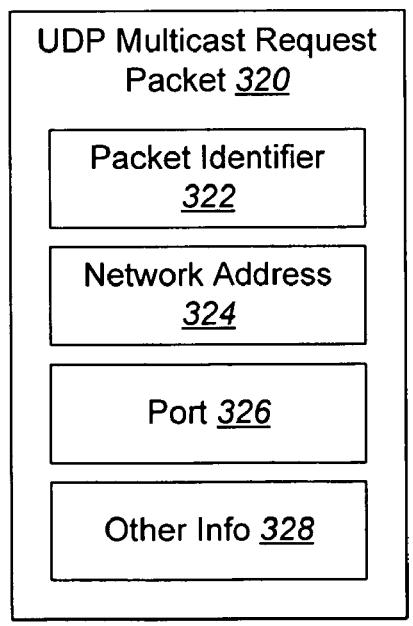
FIG. 3 illustrates a UDP multicast request packet according to an embodiment.

FIG. 3 illustrates a UDP multicast request packet 320 according to an embodiment. In the illustrated embodiment, each multicast request packet 320 that is sent includes a packet identifier 322 that is globally unique. In addition to a globally unique packet identifier 322, each request packet 320 that is sent also indicates the network address 324 of the originating host 104, and the port 326 to which the originating application is bound on the originating host 104. (The originating application is the application that originally sent the request packet 320. The originating host 104 is the host 104 on which the originating application is running.) The request packet 320 typically also includes other information 328.

Figure 4:
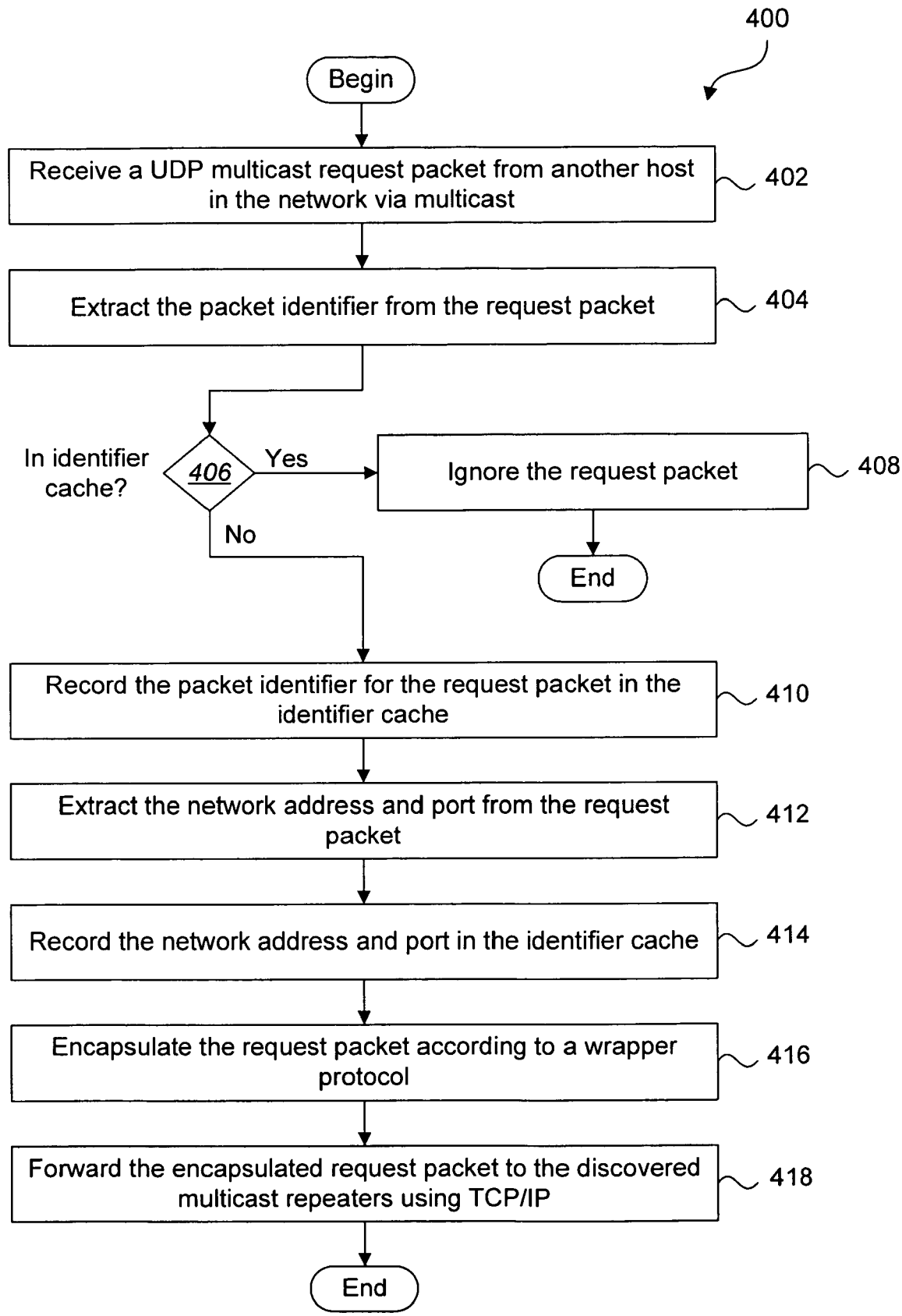
FIG. 4 illustrates the operation of a multicast repeater when it receives a UDP multicast request packet from another host in its network via multicast according to an embodiment.

FIG. 4 illustrates the operation of a multicast repeater 108 when it receives 402 a UDP multicast request packet 320 from another host 104 in its network 102 via multicast. In step 404, the multicast repeater 108 extracts the packet identifier 322 from the request packet 320 that was received in step 402.

In step 406, the multicast repeater 108 searches for the packet identifier 322 in its identifier cache 218. If the packet identifier 322 is already stored in the identifier cache 218, this means that the multicast repeater 108 has already processed the request packet 320, and in step 408 the request packet 320 is ignored in order to prevent looping. However, if an entry in the identifier cache 218 does not already exist for the request packet 320, in step 410 the multicast repeater 108 records the packet identifier 322 for the request packet 320 in the identifier cache 218. In some embodiments, the identifier 322 is only valid for a limited time, which is preferably long enough to use the identifier cache 218 to detect a loop.

In step 412, the multicast repeater 108 extracts from the request packet 320 received in step 402 the network address 324 of the originating host 104 and the port 326 on the originating host 104 to which the originating application is bound. In step 414, the multicast repeater 108 records this information in the identifier cache 218. If any responses to the multicast request 320 are subsequently received, the network address 324 and port 326 may be used to return the responses to the originating application. This will be explained in greater detail below.

In step 416, the multicast repeater 108 encapsulates the data of the request packet 320, including the packet identifier 322, according to a wrapper protocol. In step 418, the multicast repeater 108 forwards the encapsulated request packet 320, using TCP/IP, to each repeater 108 that has been discovered (e.g., to each repeater 108 that is identified in the list 216 of discovered repeaters).

Figure 5:
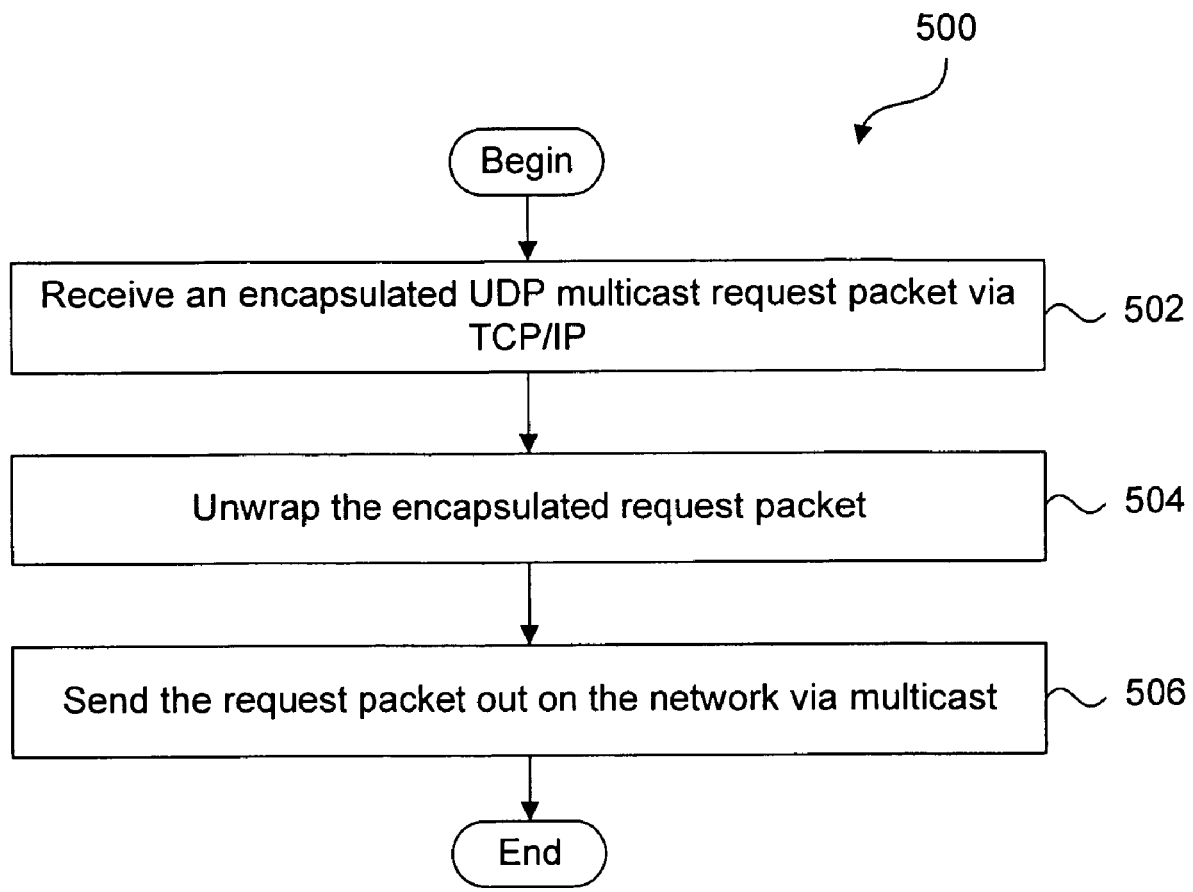
FIG. 5 illustrates the operation of the multicast repeater when it receives a UDP multicast request packet that originated on another network and that has been forwarded to the multicast repeater via TCP/IP according to an embodiment.

FIG. 5 illustrates the operation of the multicast repeater 108 when it receives 502 a UDP multicast request packet 320 that originated on another network 102 and that has been forwarded to the multicast repeater 108 via TCP/IP. As indicated above, when a multicast repeater 108 forwards a request packet 320 to other multicast repeaters 108 via TCP/IP, the request packet 320 is encapsulated according to a wrapper protocol prior to transmission. Accordingly, in step 504 the multicast repeater 108 unwraps the encapsulated request packet 320 to obtain the encapsulated data. In step 506, the multicast repeater 108 sends the request packet 320 out on its network 102 via multicast.

Figure 6:
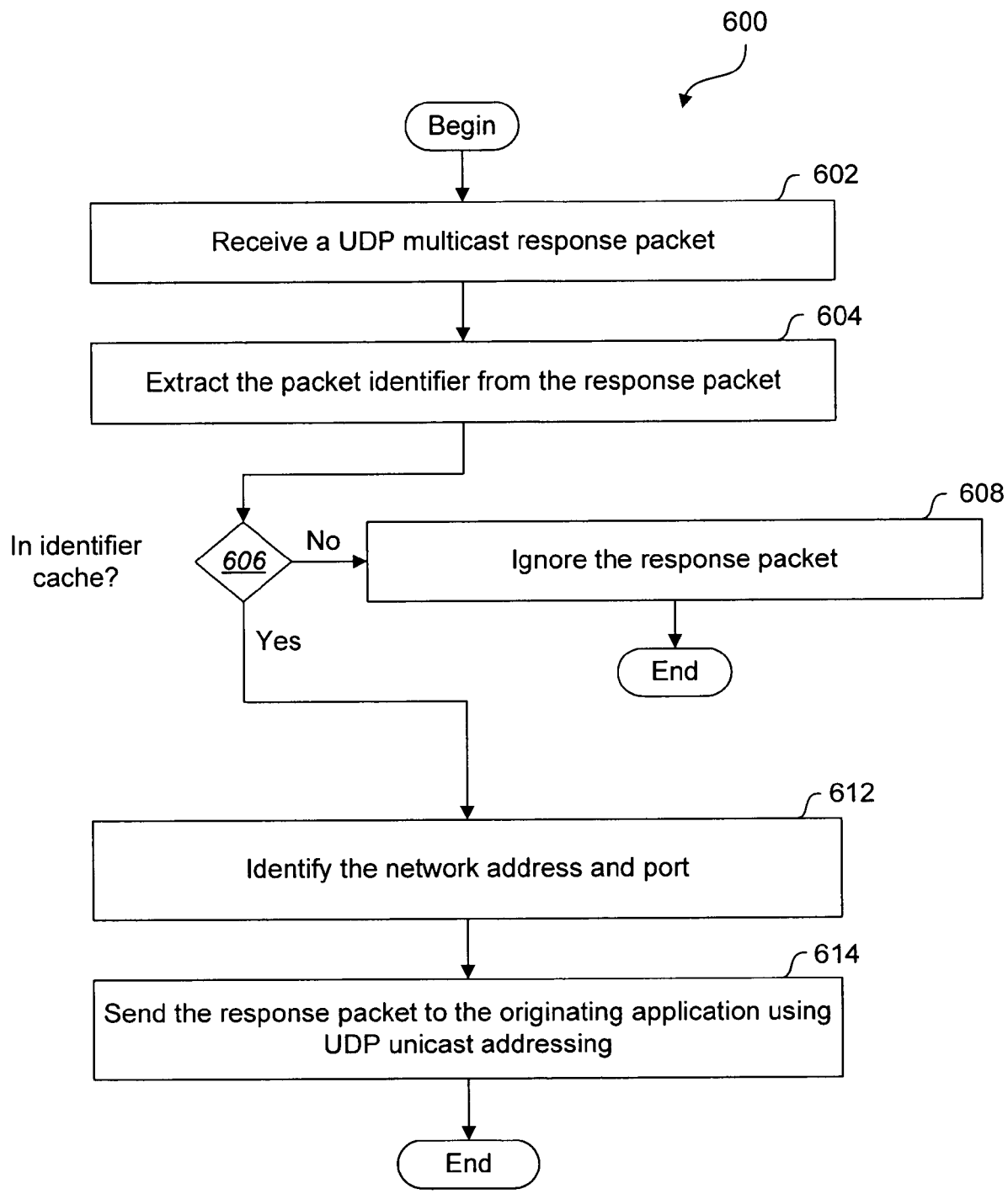
FIG. 6 illustrates the operation of the multicast repeater when it receives a UDP multicast response packet according to an embodiment.

FIG. 6 illustrates the operation of the multicast repeater 108 when it receives 602 a UDP multicast response packet from another multicast repeater 108. In step 604, the multicast repeater 108 extracts the packet identifier 322 from the response packet. (In the illustrated embodiment, the packet identifier 322 that is contained within a response packet is the same as the packet identifier 322 for the corresponding request packet 320.) In step 606, the multicast repeater 108 searches its identifier cache 218 for the packet identifier 322 that was extracted in step 604. If the packet identifier 322 is not stored in the identifier cache 218, this means that the multicast repeater 108 did not forward the request packet 320 that corresponds to the response packet. Accordingly, in step 608 the multicast repeater 108 ignores the response packet.

If the packet identifier 322 is in the identifier cache 218, then in step 612 the multicast repeater 108 identifies the network address 324 of the originating host 104 and the port 326 associated with the originating application. This may involve using the packet identifier 322 to look up the network address 324 and port 326 in the repeater's 108 identifier cache 218. In step 614, the repeater 108 sends the response to the originating application using UDP unicast addressing.

A repeater 108 may be configured to only forward multicast requests. In some embodiments, a repeater 108 that only forwards multicast requests does not advertise itself as a repeater, and therefore cannot be discovered by other repeaters. This allows bridges to be set up in only one direction between networks 102.

Figure 7:
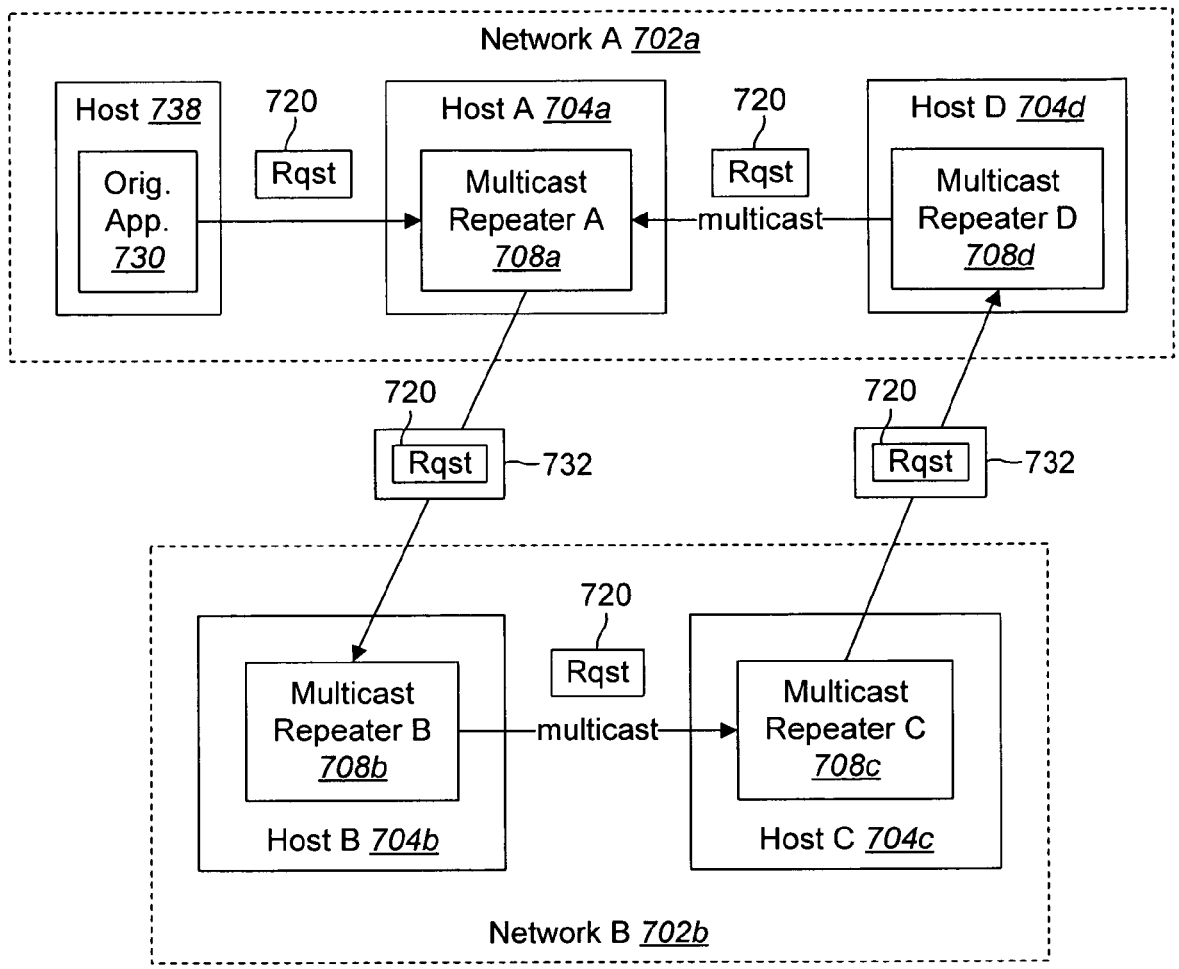
FIGS. 7-8 illustrate an example showing the operation of several multicast repeaters in different networks according to an embodiment.
Figure 8:
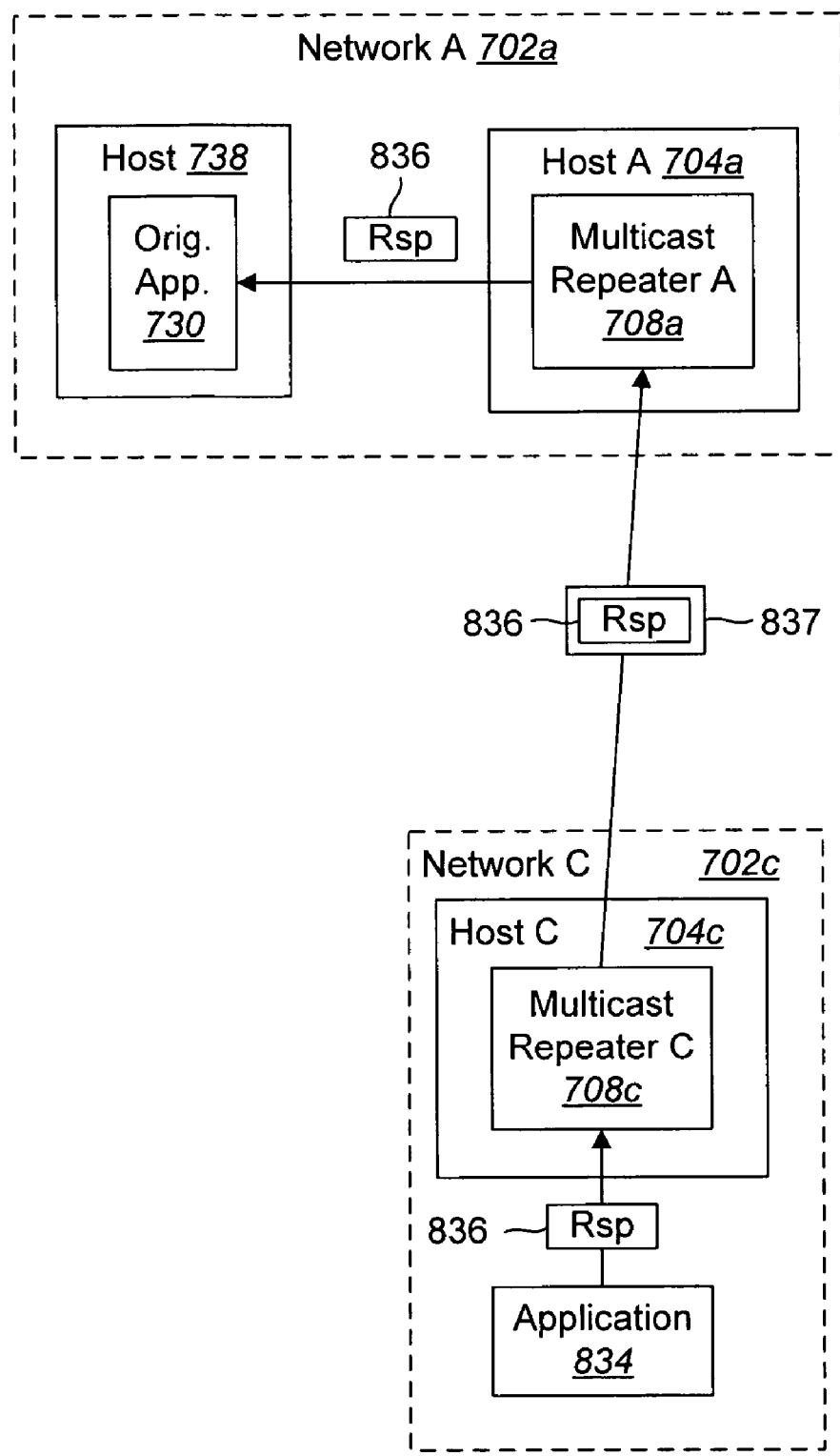

FIGS. 7-8 illustrate an example showing the operation of several multicast repeaters 708 in different networks 702 according to an embodiment. Two networks 702 are provided in the illustrated example, namely network A 702a and network B 702b. The different networks 702 are connected to one another by networking devices (not shown) that are not configured to route multicast addressing. Accordingly, using conventional approaches, it may be difficult for multicast requests that originate on one of the networks 702 to be delivered to hosts on any of the other networks 702.

To address this issue, each network 702 includes at least one host 704 that includes a multicast repeater 708. Network A 702a includes host A 704a and host D 704d. Host A 704a includes multicast repeater A 708a. Host D 704d includes multicast repeater D 708d. Network B 702b includes host B 704b and host C 704c. Host B 704b includes multicast repeater B 708b. Host C 704c includes multicast repeater C 708c. TCP/IP connections are established between host A 704a on network A 702a and host B 704b on network B 702b, and between host C 704c on network B 702b and host D 704d on network A 702a.

As shown in FIG. 7, an originating application 730 on an originating host 738 sends a UDP multicast request packet 720 via multicast on network A 702a. Multicast repeater A 708a receives the request packet 720. Before forwarding the request packet 720, multicast repeater A 708a prepares the request packet 720 for transmission via TCP/IP. In particular, multicast repeater A 708a encapsulates the data of the request packet 720, thereby generating an encapsulated request packet 732.

Multicast repeater A 708a then forwards the request packet 720, via TCP/IP, to the other multicast repeaters 708 that it has discovered. In the illustrated example, it will be assumed that multicast repeater A 708a has discovered multicast repeater B 708b. Accordingly, multicast repeater A 708a forwards the encapsulated request packet 732 to multicast repeater B 708b via TCP/IP.

When multicast repeater B 708b receives the encapsulated request packet 732, it unwraps the encapsulated request packet 732 to obtain the encapsulated data, i.e., the request packet 720 itself. Multicast repeater B 708b then sends the request packet 720 out on network B 702b via multicast.

When multicast repeater C 708c receives the request packet 720, it forwards the request packet 720 to the other multicast repeaters 708 that it has discovered. In the illustrated example, it will be assumed that multicast repeater C 708c has discovered multicast repeater D 708d. Accordingly, multicast repeater C 708c forwards the encapsulated request packet 732 to multicast repeater D 708d via TCP/IP.

When multicast repeater D 708d receives the encapsulated request packet 732, it unwraps the encapsulated request packet 732 to obtain the encapsulated data, i.e., the request packet 720 itself. Multicast repeater D 708d then sends the request packet 720 out on network A 702a via multicast. When multicast repeater A 708a again receives the request packet 720 it determines if it has already received the request packet 720. As explained above, it may do this by extracting a packet identifier (not shown in FIG. 7) from the request packet 720, and searching for the packet identifier in an identifier cache (not shown in FIG. 7) that it maintains. When multicast repeater A 708a determines that it has already received and forwarded the request packet 720, it simply ignores the request packet 720. In this way, a loop is detected and prevented in a non-destructive manner, i.e., the mechanism for providing a network bridge for UDP multicast traffic is allowed to continue even though the loop is detected.

FIG. 8 illustrates the operation of the multicast repeaters 708 in the different networks when an application 834 on host C 704c responds to the multicast request 720. The application 834 sends a response packet 836 out on network C 702c via unicast, and multicast repeater C 708c receives the response packet 836. Multicast repeater C 708c wraps the response packet 836 and sends the encapsulated response packet 837 to multicast repeater A 708a on network A 702a via TCP/IP. If there are multiple multicast repeaters 708 connected via TCP/IP to multicast repeater C 708c, the response 836 may be returned to all multicast repeaters 708 in the case where multicast repeater C 708c cannot determine which multicast repeater 708 forwarded the request 720. If a multicast repeater 708 receives a response 836 to a request 720 that it did not forward, then the multicast repeater 708 may ignore the response 836.

When multicast repeater A 708a receives the encapsulated response packet 837, it unwraps the encapsulated response packet 837 to obtain the encapsulated data (i.e., the response packet 836 itself) and checks the packet identifier. If the packet identifier is not in the cache of multicast repeater A 708a, the response packet 836 is ignored. Multicast repeater A 708a uses the packet identifier with its cache to identify the network address of the originating host 738 and the port associated with the originating application 730. Multicast repeater A 708*a* then sends the response packet 836 to the originating application 730 using UDP unicast addressing.

Figure 9:
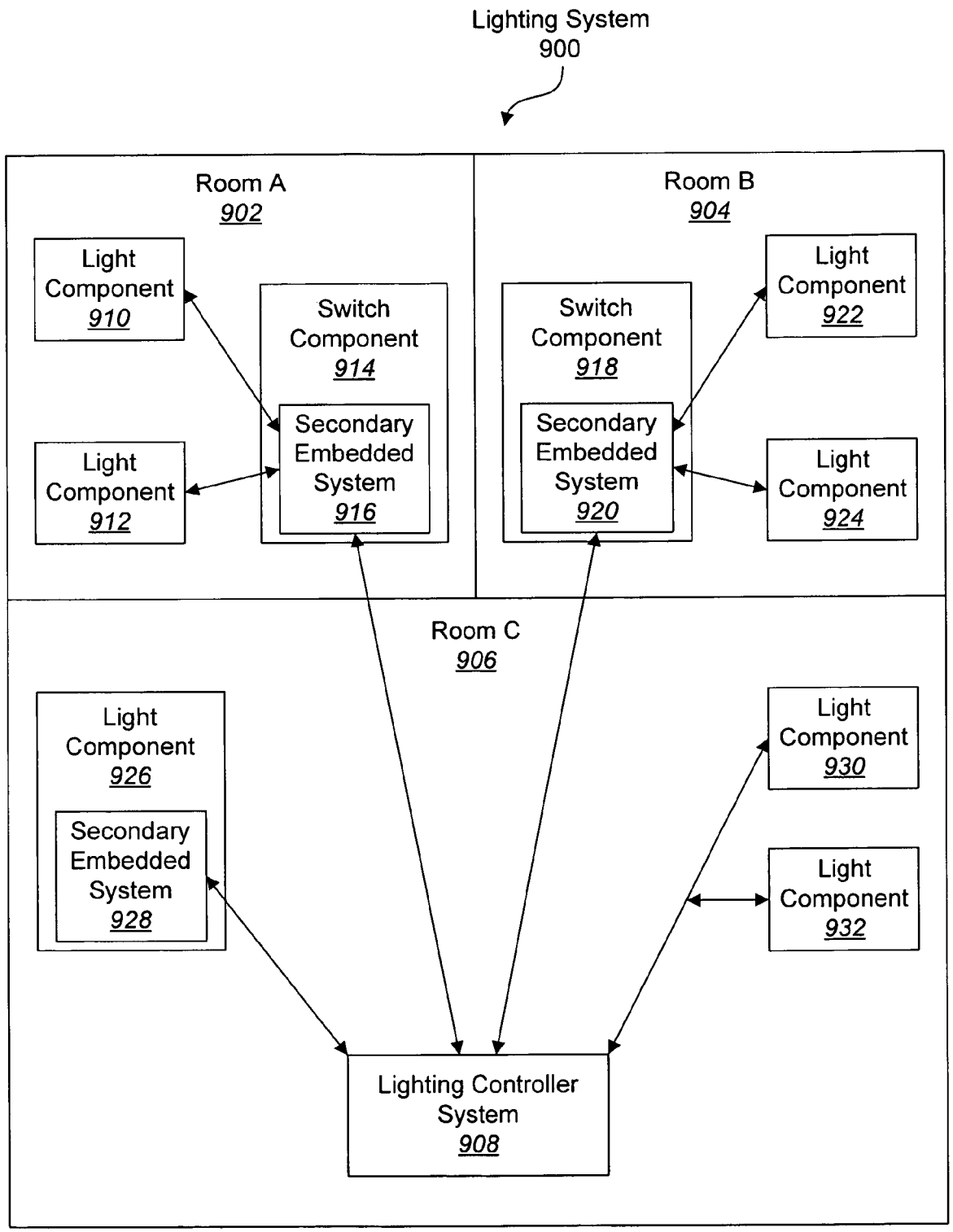
FIG. 9 illustrates an exemplary lighting system in which the present systems and methods may be implemented.

The present systems and methods may be used in several contexts. FIG. 9 illustrates one embodiment of a system wherein the present systems and methods may be implemented. FIG. 9 is a block diagram that illustrates one embodiment of a lighting system 900 that includes a lighting controller system 908. The lighting system 900 of FIG. 9 may be incorporated in various rooms in a home. As illustrated, the system 900 includes a room A 902, a room B 904, and a room C 906. Although three rooms are shown in FIG. 9, the system 900 may be implemented in any number and variety of rooms within a home, dwelling, or other environment.

The lighting controller system 908 may monitor and control additional embedded systems and components within the system 900. In one embodiment, the room A 902 and the room B 904 each include a switch component 914, 918. The switch components 914, 918 may also include a secondary embedded system 916, 920. The secondary embedded systems 916, 920 may receive instructions from the lighting controller system 908. The secondary embedded systems 916, 920 may then execute these instructions. The instructions may include powering on or powering off various light components 910, 912, 922, and 924. The instructions may also include dimming the brightness or increasing the brightness of the various light components 910, 912, 922, and 924. The instructions may further include arranging the brightness of the light components 910, 912, 922, and 924 in various patterns. The secondary embedded systems 916, 920 facilitate the lighting controller system 908 to monitor and control each light component 910, 912, 922, and 924 located in the room A 902 and the room B 904.

The lighting controller system 908 might also provide instructions directly to a light component 926 that includes a secondary embedded system 928 in the depicted room C 906. The lighting controller system 908 may instruct the secondary embedded system 928 to power down or power up the individual light component 926. Similarly, the instructions received from the lighting controller system 908 may include dimming the brightness or increasing the brightness of the individual light component 926.

The lighting controller system 908 may also monitor and provide instructions directly to individual light components 930 and 932 within the system 900. These instructions may include similar instructions as described previously.

Figure 10:
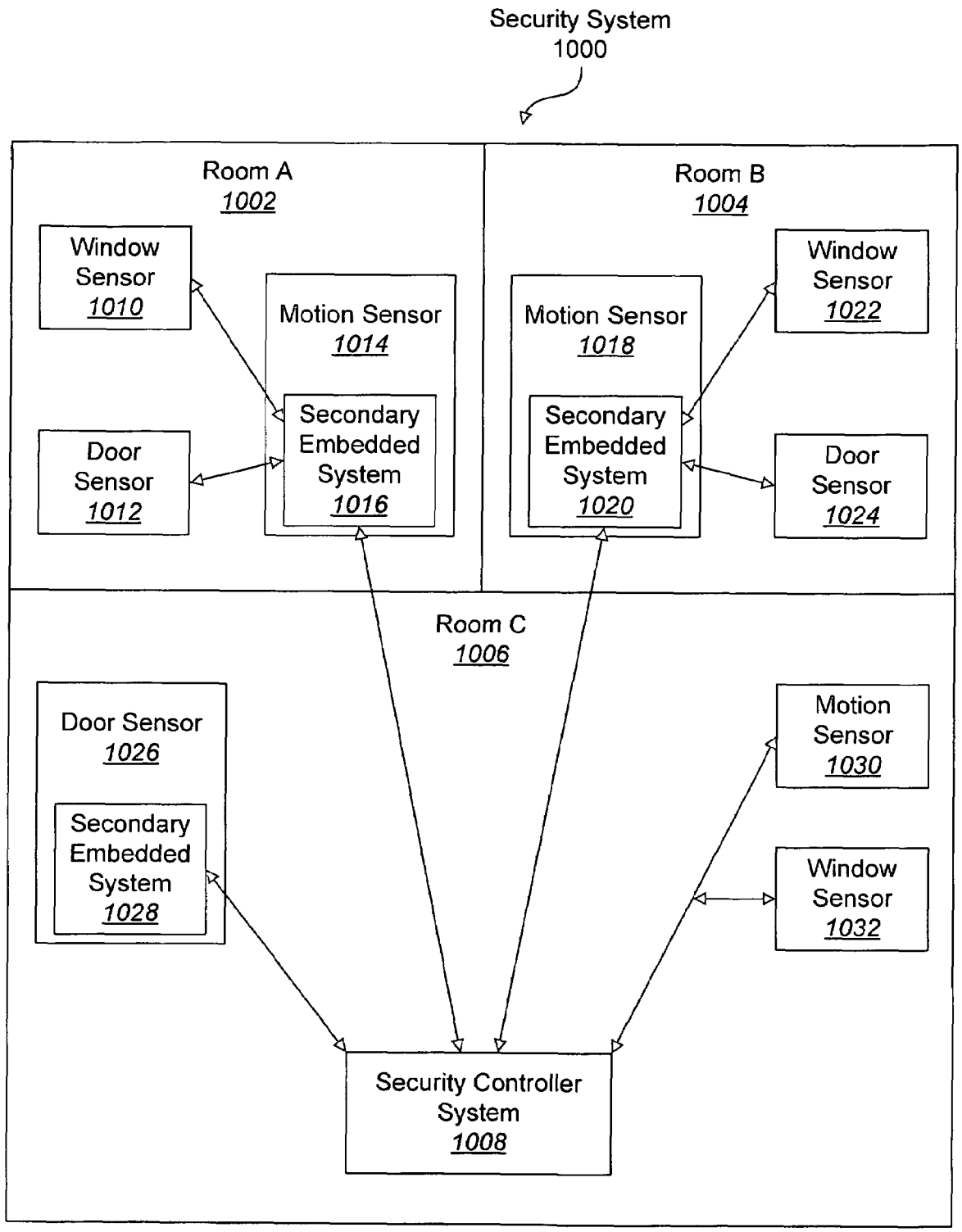
FIG. 10 illustrates an exemplary security system in which the present systems and methods may be implemented.

FIG. 10 is an additional embodiment of a system wherein the present systems and methods of the present invention may be implemented. FIG. 10 is a block diagram illustrating a security system 1000. The security system 1000 in the depicted embodiment is implemented in a room A 1002, a room B 1004, and a room C 1006. These rooms may be in the confines of a home or other enclosed environment. The system 1000 may also be implemented in an open environment where the rooms A, B and C, 1002, 1004, and 1006 respectively represent territories or boundaries.

The system 1000 includes a security controller system 1008. The security controller system 1008 monitors and receives information from the various components within the system 1000. For example, a motion sensor 1014, 1018 may include a secondary embedded system 1016. The motion sensors 1014, 1018 may monitor an immediate space for motion and alert the security controller system 1008 when motion is detected via the secondary embedded system 1016, 1020. The security controller system 1008 may also provide instructions to the various components within the system 1000. For example, the security controller system 1008 may provide instructions to the secondary embedded systems 1016, 1020 to power up or power down a window sensor 1010, 1022 and a door sensor 1012, 1024. In one embodiment, the secondary embedded systems 1016, 1020 notify the security controller system 1008 when the window sensors 1010, 1022 detect movement of a window. Similarly, the secondary embedded systems 1016, 1020 notify the security controller system 1008 when the door sensors 1012, 1024 detect movement of a door. The secondary embedded systems 1016, 1020 may instruct the motion sensors 1014, 1018 to activate the LED (not shown) located within the motion sensors 1014, 1018.

The security controller system 1008 may also monitor and provide instructions directly to individual components within the system 1000. For example, the security controller system 1008 may monitor and provide instructions to power up or power down to a motion sensor 1030 or a window sensor 1032. The security controller system 1008 may also instruct the motion sensor 1030 and the window sensor 1032 to activate the LED (not shown) or audio alert notifications within the sensors 1030 and 1032.

Each individual component comprising the system 1000 may also include a secondary embedded system. For example, FIG. 10 illustrates a door sensor 1026 including a secondary embedded system 1028. The security controller system 1008 may monitor and provide instructions to the secondary embedded system 1028 in a similar manner as previously described.

Figure 11:
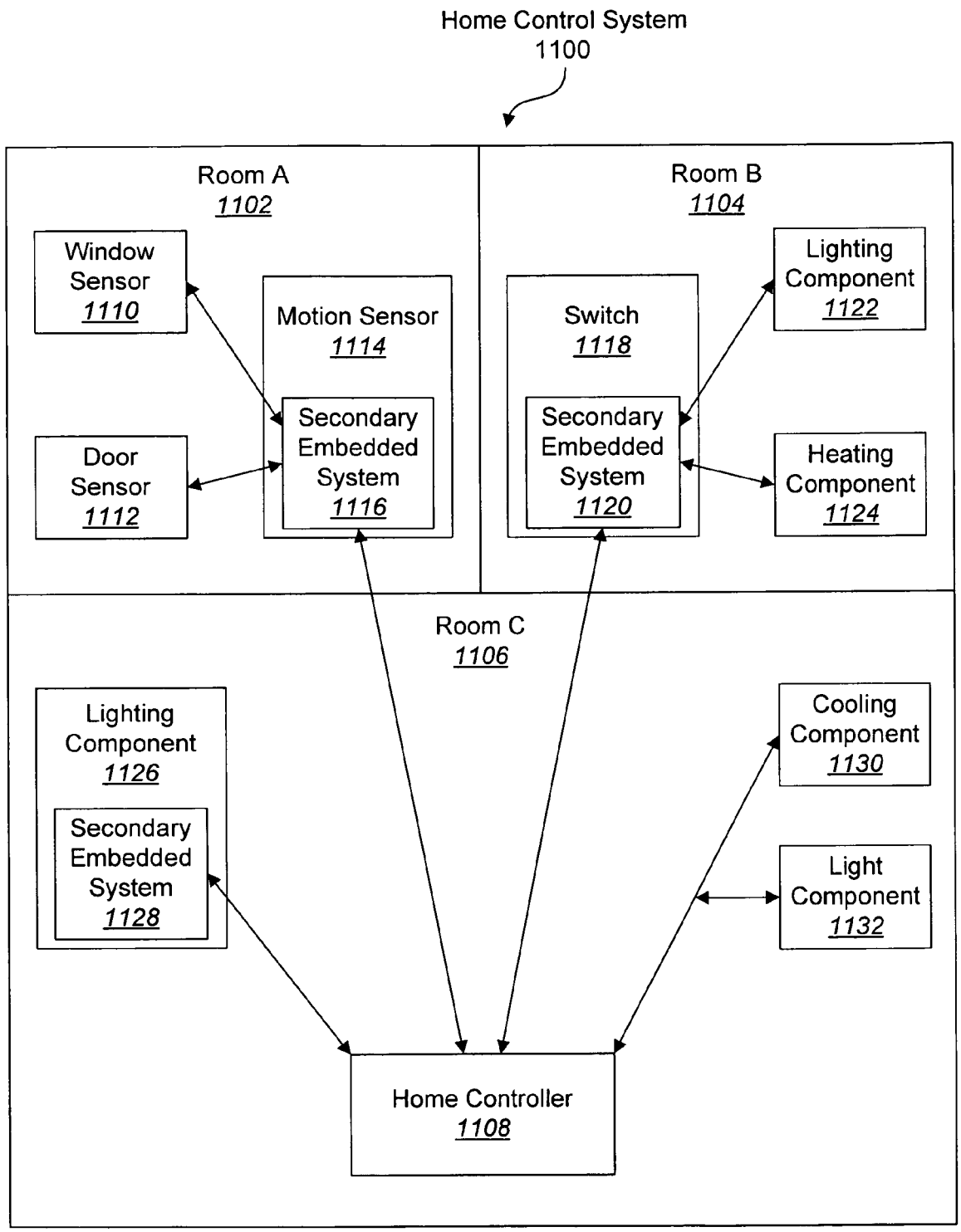
FIG. 11 illustrates an exemplary home controller system in which the present systems and methods may be implemented.

FIG. 11 is a block diagram illustrating one embodiment of a home control system 1100. The home control system 1100 includes a home controller 1108 that facilitates the monitoring of various systems such as the lighting system 900, the security system 1000, and the like. The home control system 1100 allows a user to control various components and systems through one or more embedded systems. In one embodiment, the home controller system 1108 monitors and provides information in the same manner as previously described in relation to FIGS. 9 and 10. In the depicted embodiment, the home controller 1108 provides instructions to a heating component 1124 via a secondary embedded system 1120. The heating component 1124 may include a furnace or other heating device typically found in resident locations or offices. The home controller system 1108 may provide instructions to power up or power down the heating component 1124 via the secondary embedded system 1120.

Similarly, the home controller 1108 may monitor and provide instructions directly to a component within the home control system 1100 such as a cooling component 1130. The cooling component 1130 may include an air conditioner or other cooling device typically found in resident locations or offices. The central home controller 1108 may instruct the cooling component 1130 to power up or power down depending on the temperature reading collected by the central embedded system 1108. The home control system 1100 functions in a similar manner as previously described in relation to FIGS. 9 and 10.

Figure 12:
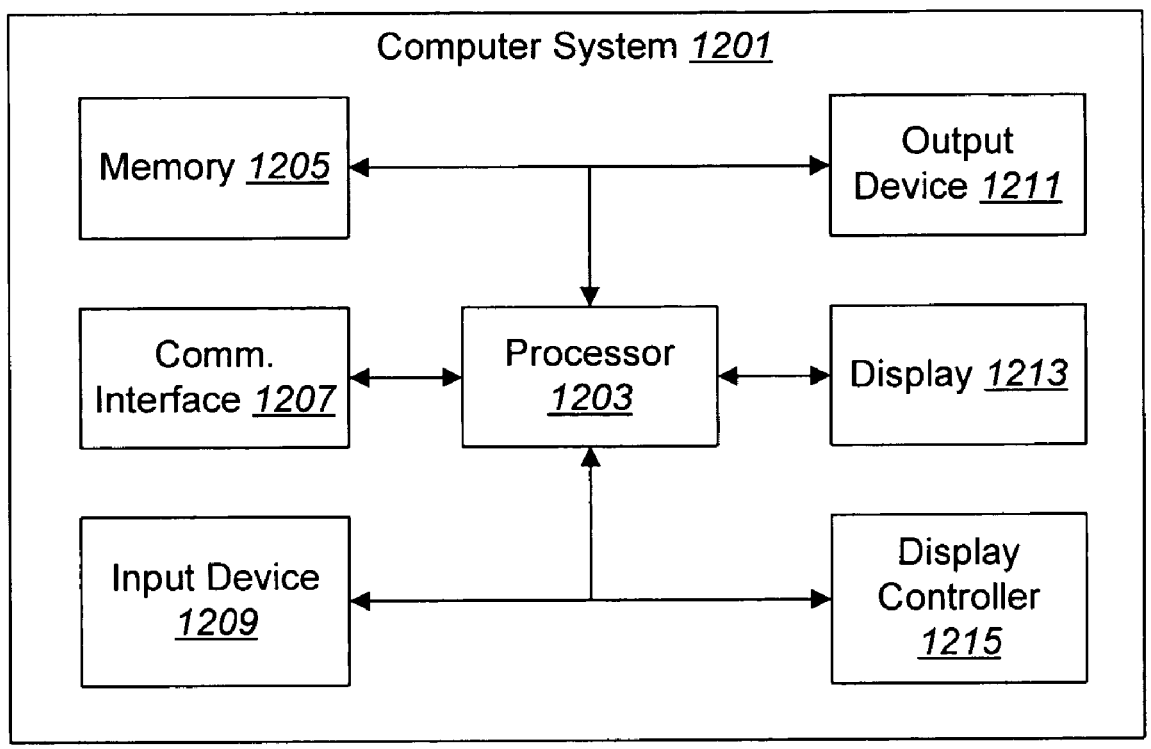
FIG. 12 is a block diagram illustrating the major hardware components typically utilized in a computer system.

FIG. 12 is a block diagram illustrating the major hardware components typically utilized in a computer system 1201. The illustrated components may be located within the same physical structure or in separate housings or structures.

The computer system 1201 includes a processor 1203 and memory 1205. The processor 1203 controls the operation of the computer system 1201 and may be embodied as a microprocessor, a microcontroller, a digital signal processor (DSP) or other device known in the art. The processor 1203 typically performs logical and arithmetic operations based on program instructions stored within the memory 1205.

As used herein, the term memory 1205 is broadly defined as any electronic component capable of storing electronic information, and may be embodied as read only memory (ROM), random access memory (RAM), magnetic disk storage media, optical storage media, flash memory devices in RAM, on-board memory included with the processor 1203, EPROM memory, EEPROM memory, registers, etc. The memory 1205 typically stores program instructions and other types of data. The program instructions may be executed by the processor 1203 to implement some or all of the methods disclosed herein.

The computer system 1201 typically also includes one or more communication interfaces 1207 for communicating with other electronic devices. The communication interfaces 1207 may be based on wired communication technology, wireless communication technology, or both. Examples of different types of communication interfaces 1207 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1201 typically also includes one or more input devices 1209 and one or more output devices 1211. Examples of different kinds of input devices 1209 include a keyboard, mouse, microphone, remote control device, button, joystick, trackball, touchpad, lightpen, etc. Examples of different kinds of output devices 1211 include a speaker, printer, etc. One specific type of output device which is typically included in a computer system is a display device 1213. Display devices 1213 used with embodiments disclosed herein may utilize any suitable image projection technology, such as a cathode ray tube (CRT), liquid crystal display (LCD), light-emitting diode (LED), gas plasma, electroluminescence, or the like. A display controller 1215 may also be provided, for converting data stored in the memory 1205 into text, graphics, and/or moving images (as appropriate) shown on the display device 1213.

Of course, FIG. 12 illustrates only one possible configuration of a computer system 1201. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing a network bridge for UDP multicast traffic, the method being implemented by a multicast repeater on a host computer system on a network, the method comprising:

maintaining information on a host computer system on a network about one or more other multicast repeaters that have been discovered, each multicast repeater being located on a separate network that is separated from the network comprising the host by at least one networking device that is not configured to route UDP multicast addressing; and each time that a UDP multicast request packet is received via multicast:
determining whether the multicast repeater has previously forwarded the UDP multicast request packet;
if the multicast repeater has previously forwarded the UDP multicast request packet, ignoring the UDP multicast request packet; and
if the multicast repeater has not previously forwarded the UDP multicast request packet, sending the UDP multicast request packet to the one or more other multicast repeaters that have been discovered.

2. The method of claim 1, wherein the UDP multicast request packet is sent via TCP/IP to the one or more other multicast repeaters that have been discovered.

3. The method of claim 1, further comprising encapsulating data of the UDP multicast request packet according to a wrapper protocol prior to sending the UDP multicast request packet to the one or more other multicast repeaters.

4. The method of claim 1, further comprising, whenever a forwarded UDP multicast request packet is received from another multicast repeater on a different network, sending the forwarded UDP multicast request packet via multicast on the multicast repeater's network.

5. The method of claim 4, wherein when the forwarded UDP multicast request packet is received, data of the forwarded UDP multicast request packet is encapsulated according to a wrapper protocol, and further comprising unwrapping the forwarded UDP multicast request packet to obtain the encapsulated data.

6. The method of claim 1, wherein determining whether the multicast repeater has previously forwarded the UDP multicast request packet comprises:
   extracting a globally unique packet identifier from the UDP multicast request packet; and
   searching for the packet identifier in an identifier cache.

7. The method of claim 6, further comprising, if the multicast repeater has not previously forwarded the UDP multicast request packet, recording the packet identifier in the identifier cache.

8. The method of claim 7, further comprising, if the multicast repeater has not previously forwarded the UDP multicast request packet, recording a network address and port where the UDP multicast request packet originated in the identifier cache.

9. The method of claim 1, further comprising registering with a UDP server on the host computer system to receive any UDP multicast packets that the UDP server receives.

10. The method of claim 1, further comprising, whenever a UDP multicast response packet is received, determining whether a corresponding UDP multicast request packet originated on the network.

11. The method of claim 10, further comprising, if the corresponding UDP multicast request packet originated on the network:
    identifying an originating application for the corresponding UDP multicast request packet; and
    sending the UDP multicast response packet to the originating application.

12. The method of claim 11, wherein the UDP multicast response packet is sent to the originating application using UDP unicast addressing.

13. The method of claim 11, wherein identifying the original application comprises:
    extracting a globally unique packet identifier from the UDP multicast response packet;
    using the packet identifier to look up a network address of an originating host and a port of the originating application in an identifier cache.

14. The method of claim 1, further comprising ignoring any received UDP multicast response packets that do not correspond to any UDP multicast request packets that the multicast repeater has previously forwarded.

15. The method of claim 1, wherein the networking device is selected from the group consisting of a router and a firewall.

16. A host computer system that is configured to implement a method for providing a network bridge for UDP multicast traffic, the computer system comprising:
    a processor;
    memory in electronic communication with the processor;
    a multicast repeater stored in the memory, the multicast repeater being executable to:
        maintain information on a host computer system on a network about one or more other multicast repeaters that have been discovered, each multicast repeater being located on a separate network that is separated from a network comprising the host by at least one networking device that is not configured to route UDP multicast addressing; and
        each time that a UDP multicast request packet is received via multicast:
            determining whether the multicast repeater has previously forwarded the UDP multicast request packet;
            if the multicast repeater has previously forwarded the UDP multicast request packet, ignoring the UDP multicast request packet; and
            if the multicast repeater has not previously forwarded the UDP multicast request packet, sending the UDP multicast request packet to the one or more other multicast repeaters that have been discovered.

17. The host computer system of claim 16, further comprising:
    a server application stored in the memory, the server application comprising the multicast repeater;
    a UDP server within the server application, the UDP server being configured to listen to a multicast address and port on the host computer system; and
    a TCP/IP connection module within the server application, the TCP/IP connection module being configured to establish TCP/IP connections to the one or more other multicast repeaters.

18. A computer-readable medium encoded with executable instructions for:
    maintaining information on a host computer system on a network about one or more other multicast repeaters that have been discovered, each multicast repeater being located on a separate network that is separated from the network comprising the host by at least one networking device that is not configured to route UDP multicast addressing; and
    each time that a UDP multicast request packet is received via multicast:
        determining whether the multicast repeater has previously forwarded the UDP multicast request packet;
        if the multicast repeater has previously forwarded the UDP multicast request packet, ignoring the UDP multicast request packet; and
        if the multicast repeater has not previously forwarded the UDP multicast request packet, sending the UDP multicast request packet to the one or more other multicast repeaters that have been discovered.

* * * * *